June 24, 1924.
W. S. PIERCE, JR
BALL RACE
Filed Nov. 19, 1921
1,498,748
Fig.1,
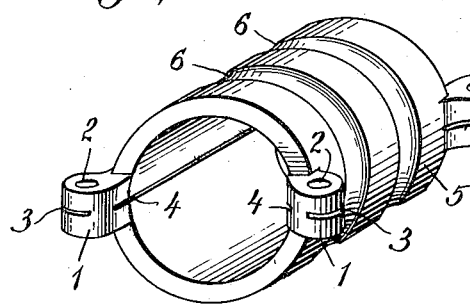
Fig.2,
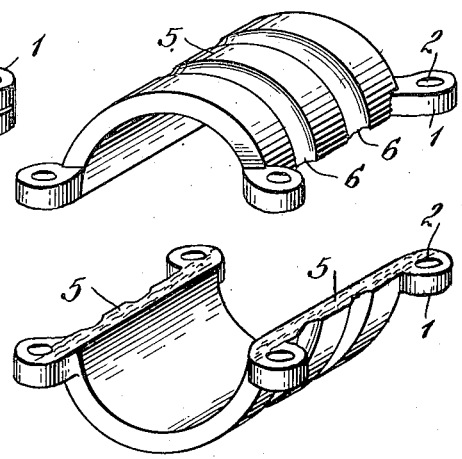
Fig.3,
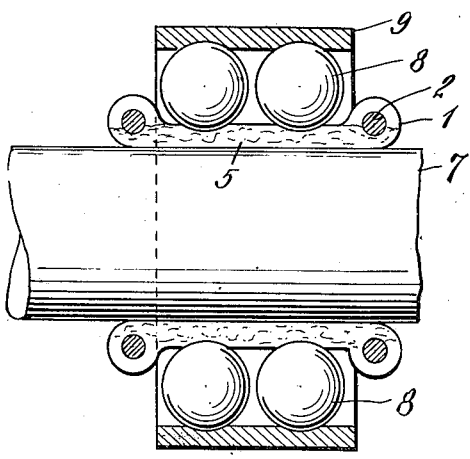
Fig.4,
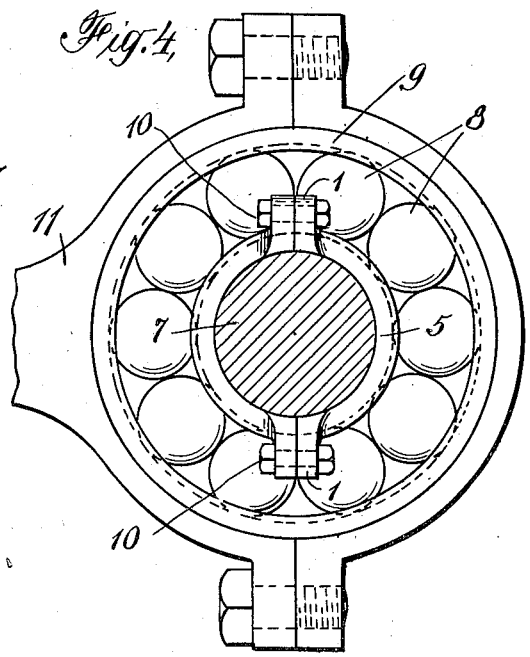
INVENTOR.
Winslow S. Pierce Jr.
BY
Pennie Davis Marvin & Edmonds
ATTORNEY.

Patented June 24, 1924.

1,498,748

UNITED STATES PATENT OFFICE.

WINSLOW S. PIERCE, JR., OF BAYVILLE, NEW YORK.

BALL RACE.

Application filed November 19, 1921. Serial No. 516,269.

*To all whom it may concern:*

Be it known that I, WINSLOW S. PIERCE, Jr., residing at Bayville, in the county of Nassau, State of New York, have invented certain new and useful Improvements in Ball Races; and I do hereby declare the following to be a full, clear, and exact description of the invention, such as will enable others skilled in the art to which it appertains to make and use the same.

My invention relates to the type of radial ball bearing having ball races made in two parts. This type of bearing is often used where it is impossible to slip a one piece ball race onto a shaft, as in the case of an automobile crank shaft.

In the past, considerable difficulty has been encountered in making a suitable inner ball race to meet this requirement. This difficulty was due to the fact that it is very tedious and expensive to so machine the two parts of the race that they will exactly fit the shaft. The race must fit tightly on the shaft and there must be no gap between the two segments, for the race must offer an unbroken, smooth path for the balls. Even after the two parts of the race were properly machined, it was not certain that they would fit the shaft, for the heat treatment during the hardening process has a tendency to change the shape of the parts.

In the present invention the ball race is so made that the above mentioned difficulties are not present. The race is made from a solid piece of metal which is machined to the proper dimensions to fit the shaft, hardened and then broken into two halves along a longitudinal plane.

Referring to the drawing—

Fig. 1 is a perspective view of the machine ball race before it has been broken in two;

Fig. 2 is a perspective view of the ball race ready to be mounted on a shaft;

Fig. 3 shows one segment of the race mounted on a shaft; and

Fig. 4 shows the complete ball race incorporated in a ball bearing of the type used on an automobile crank shaft.

The embodiment of the invention disclosed in the drawing shows an inner ball race made from a single cylindrical piece of metal. The cylinder is machined to its final dimensions, both inside and out. The inner diameter is such that the cylinder will fit tightly on a shaft. The outer surface is carefully machined and polished, grooves which serve as paths for the balls being made in the surface. The number of these grooves is immaterial to the present invention. In the drawing two grooves are shown, however, there may be any number depending upon the particular purpose for which the race is designed.

During the process of machining the cylinder, four lugs are shaped thereon, two at each end. These lugs 1 are all located in the same plane and are large enough so that holes 2 may be drilled through them for receiving bolts. After the holes 2 have been drilled, saw cuts 3 are made in the plane of the lugs and may either partially or completely sever the lugs. These cuts are preferably made as narrow as possible.

After the cylinder has been machined to the proper dimensions, two narrow grooves 4 are made on the inside of the cylinder in the plane of the lugs. These grooves 4 may be made by means of a saw or a suitable machine tool and may be made as deep as desired, care being taken to see that they do not intersect the grooves 6 which form the paths for the balls. The purpose of these grooves 4 on the inside of the cylinder and of the cuts 3 in the lugs is to form a weak plane in the cylinder so that when it is broken the fracture will occur in the plane of the lugs.

The cylinder is now ready to be hardened. This is accomplished by the usual heat treatment, the ultimate degree of hardness being immaterial to the present invention.

After the cylinder is hardened it is broken along the weak plane of the lugs 1 and horizontal grooves 4. The breaking force, which may be applied by any suitable means, is preferably applied at right angles to the plane of the fracture. Care must be taken not to injure the broken surfaces 5, for it is necessary for the two parts to fit together exactly. This is necessary in order that there may be no break in the smooth paths 6 for the balls.

The inner ball race is then assembled on a shaft 7 together with the balls 8 and the outer race 9. The two parts of the improved race may be secured together by any suitable means, but are preferably secured by means of bolts 10 passing through the holes 2 in the lugs 1. The crank 11 is secured to the outer race in the usual manner.

This method of making a ball race has been shown as applied to an inner race. It may, however, be applied equally well to an outer race, and the invention is accordingly not limited in this respect. Of course the order in which the steps of my improved process are carried out may be altered without departing from the principle of this invention. For example, the machining may be performed after the ball race is broken, the two parts of the ball race of course being clamped together during the machining operation.

I claim:

1. A ball race having two longitudinal segments contacting with each other across a broken surface, and means for securing the two segments together.

2. A ball race having two longitudinal segments, contacting with each other across a broken surface, and each provided with lugs, and means for securing said segments together consisting of bolts passing through said lugs.

3. A ball bearing having an outer ball race, a plurality of balls, and an inner ball race consisting of two longitudinal segments contacting with each other across a broken surface.

4. A ball bearing having an outer ball race, a plurality of balls, and an inner ball race consisting of two longitudinal segments contacting with each other across a broken surface, and each provided with lugs, and means for securing said segments together consisting of bolts passing through said lugs.

5. The method of making a ball race which consists in machining a cylindrical piece of metal to the proper diameter for the shaft upon which said race is to be placed, hardening the metal, breaking the race longitudinally, and assembling on said shaft.

6. The method of making a ball race which consists in machining a piece of metal to form a cylinder, shaping lugs on the cylinder at the extremity of a diametrical plane thereof, cutting said lugs in said plane, hardening the metal, and breaking the race longitudinally in the plane of the lugs.

7. The method of making a ball race which consists in machining a piece of metal to form a cylinder, shaping lugs on the cylinder at the extremities of a diametrical plane thereof, cutting said lugs in said plane, hardening the metal, breaking the race longitudinally in the plane of the lugs, and assembling on a shaft.

8. The method of making a ball race which consists in machining a piece of metal to form a cylinder, shaping lugs on the cylinder at the extremities of a diametrical plane thereof, cutting said lugs in said plane, hardening the metal, breaking the race longitudinally in the plane of the lugs, and assembling upon a shaft by means of bolts passing through said lugs.

In testimony whereof I affix my signature.

WINSLOW S. PIERCE, Jr.